United States Patent
Jhang et al.

(10) Patent No.: US 9,589,460 B2
(45) Date of Patent: Mar. 7, 2017

(54) SYSTEMS AND METHODS FOR IMPLEMENTATION OF A SMART ENERGY PROFILE USING DATA-INTERCHANGE ENCODING

(71) Applicant: Aclara Meters LLC, Hazelwood, MO (US)

(72) Inventors: Hyoung Jhang, Atlanta, GA (US); David Sampson, Atlanta, GA (US); Jeremy McKeown, Atlanta, GA (US)

(73) Assignee: Aclara Meters LLC, Hazelwood, MO (US)

( * ) Notice: Subject to any disclaimer, the term of this patent is extended or adjusted under 35 U.S.C. 154(b) by 252 days.

(21) Appl. No.: 13/670,280

(22) Filed: Nov. 6, 2012

(65) Prior Publication Data
US 2014/0125492 A1    May 8, 2014

(51) Int. Cl.
G08C 19/00 (2006.01)
H04L 12/28 (2006.01)
G01D 4/00 (2006.01)

(52) U.S. Cl.
CPC .......... *G08C 19/00* (2013.01); *H04L 12/2818* (2013.01); *H04L 12/2825* (2013.01); *H04L 12/2836* (2013.01); *G01D 4/004* (2013.01); *Y02B 90/242* (2013.01); *Y04S 20/322* (2013.01)

(58) Field of Classification Search
CPC ............. H04L 12/2825; H04L 12/2836; H04L 12/2818; G08C 19/00; G01D 4/004; Y02B 90/242; Y04S 20/322
USPC ..................................................... 340/870.02
See application file for complete search history.

(56) References Cited

U.S. PATENT DOCUMENTS

| | | | |
|---|---|---|---|
| 6,122,363 A * | 9/2000 | Friedlander et al. .......... 379/230 |
| 2002/0080753 A1* | 6/2002 | Lee ....................... H04L 67/289 370/338 |
| 2004/0122908 A1 | 6/2004 | Konopka et al. |
| 2011/0069719 A1* | 3/2011 | Fries et al. .................... 370/463 |
| 2011/0231320 A1* | 9/2011 | Irving .............................. 705/80 |
| 2011/0231541 A1* | 9/2011 | Murthy et al. ................. 709/224 |

(Continued)

OTHER PUBLICATIONS

McMorran et al., "Field Force Data Visualization: Developing an Open Mobile Platform for Integrated Data Access", Power and Energy Society General Meeting, IEEE, pp. 1-5, Jul. 22, 2012.

(Continued)

*Primary Examiner* — Yong Hang Jiang
(74) *Attorney, Agent, or Firm* — Polster, Lieder, Woodruff & Lucchesi, L.C.

(57) ABSTRACT

Embodiments of the disclosure can provide systems and methods for implementation of a smart energy profile using data-interchange encoding. According to one embodiment of the disclosure, a system can be provided. The system can include at least one memory that stores computer-executable instructions. The system can include at least one processor configured to access the at least one memory, wherein the at least one processor is configured to execute the computer-executable instructions to receive, by the at least one processor, a control instruction for a home area network (HAN) device. The at least one processor can be configured to convert the control instruction to a JSON object and transmit the JSON object to the HAN device.

19 Claims, 3 Drawing Sheets

(56) References Cited

U.S. PATENT DOCUMENTS

2012/0117511 A1* 5/2012 Agnihotri .......... H04N 5/44543
715/810

OTHER PUBLICATIONS

European Search Report issued in connection with corresponding EP Application No. 13190127.4 on Feb. 10, 2014.

* cited by examiner

SYSTEMS AND METHODS FOR IMPLEMENTATION OF A SMART ENERGY PROFILE USING DATA-INTERCHANGE ENCODING

FIELD OF THE INVENTION

Embodiments of the disclosure relate generally to advanced metering infrastructure (AMI) smart meters, and more particularly to systems and methods for implementation of a smart energy profile using data-interchange encoding.

BACKGROUND OF THE DISCLOSURE

A wide variety of utility meters are configured to measure consumption and/or communicate with other network devices. For example, smart meters can be configured to transmit messages containing consumption data and/or other monitoring data to household appliances as well as servers and/or controllers. With any communication network or communication technique that may be utilized by a utility meter, in particular, smart meters, there is an increasing demand for certain memory resources be made available.

SUMMARY

Some or all of the above needs and/or problems may be addressed by certain embodiments of the disclosure. Disclosed embodiments may include implementing a smart energy profile (SEP) using data-interchange encoding, such as Javascript Object Notation (JSON). According to one embodiment of the disclosure, there is disclosed a system with at least one memory that stores computer-executable instructions. The system can include at least one processor configured to access the at least one memory, wherein the at least one processor is configured to execute the computer-executable instructions to receive, by the at least one processor, a control instruction for a home area network (HAN) device. The at least one processor can be configured to convert the control instruction to a JSON object and transmit the JSON object to the HAN device.

According to another embodiment of the disclosure, there is disclosed a method that can include receiving, from a headend server by at least one processor of an energy service portal (ESP), a control instruction for a home area network (HAN) device. The method can further include converting the control instruction to a JavaScript Object Notation (JSON) object and transmitting the JSON object to the HAN device.

According to another embodiment of the invention, there is a disclosed one or more computer-readable media storing computer-executable instructions that, when executed by at least one processor, configure the at least one processor to perform certain operations. The operations can include receiving, from a headend server by at least one processor of an energy service portal (ESP), a control instruction for a home area network (HAN) device from a headend server; parsing the control instruction into at least a common interface model (CIM) object and at least one attribute; generating a C programming structure for the CIM object; generating a C programming schema for each at least one attribute; encoding the C programming structure and the C programming schema using a JAVASCRIPT Object Notation (JSON) syntax to create a JSON object; and transmitting the JSON object to the HAN device.

Other embodiments, systems, methods, apparatus aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION

Figure 1:
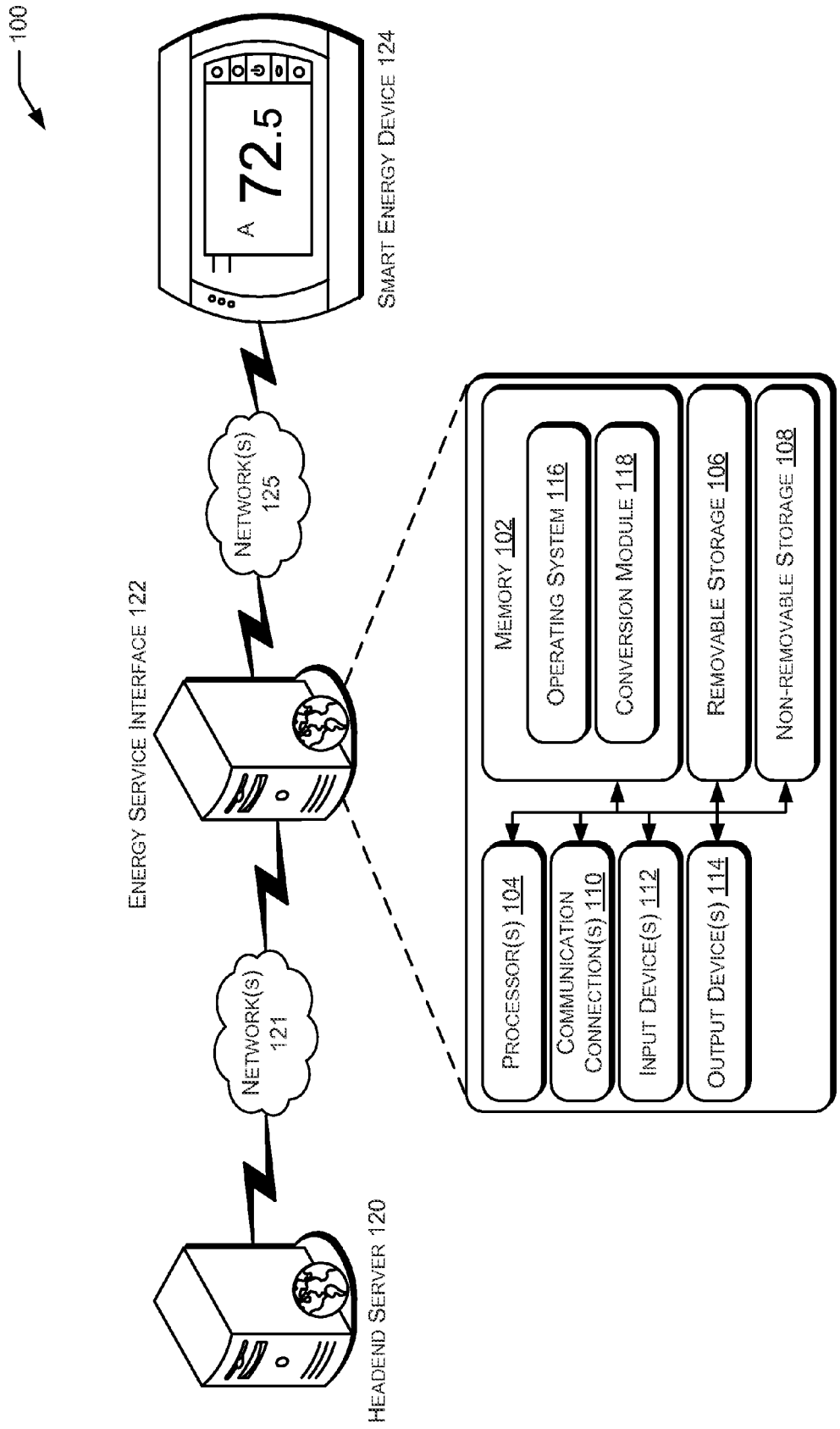
FIG. 1 is a schematic block diagram of a computer environment showing an example system for implementing a smart energy profile using a data interchange encoding, such as JSON, according to an embodiment of the disclosure.

Illustrative embodiments of the application will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. Like numbers refer to like elements throughout.

As an overview, utility companies or other electricity providers generate and/or provide electricity to a power grid. The power grid may provide electricity to customers who consume the electricity or to other utility companies. Customer usage of electricity can be monitored through one or more metering devices. In certain instances, metering devices may include network devices to communicate with the power grid and/or electricity provider. Network devices can include, but are not limited to, demand response meters, smart meters, advanced metering infrastructure (AMI) devices, and/or home area network (HAN) devices.

In certain instances, a grid center may transmit control messages to a headend server for controlling one or more other sub-grids, electricity networks, and/or other consumers or customers' usage of electricity from the power grid. A headend server may provide instructions to one or more networks of devices located in a HAN. One or more metering devices may receive messages and/or instructions from the headend server through a network. The one or more metering devices may communicate these messages and/or instructions to an associated smart energy device. In some instances, smart energy devices may have limited memory resources.

In certain embodiments of the disclosure, a headend server or other remote server can manage resources by implementing a smart energy profile (SEP). The resources may be constrained by memory of the system or by a capacity. A SEP can represent data schema for many data points to be exchanged between a smart device and a headend server. The SEP can be a standard or a protocol that may allow interoperability of various smart energy devices. A SEP can provide for a common interface model (CIM) object manager. The CIM object manager can be software or another set of computer-executable instructions that may transfer data from the headend server to the managed resources.

The CIM can be an open standard that may define how managed elements in an environment are represented as a common set of objects. The CIM may also manage the relationship between these objects and may allow consistent management of managed elements independent of the manufacturer's protocols.

However, smart energy devices have limited memory capabilities and resources. Therefore, the traditional CIM infrastructure may not be portable when controlling smart energy devices. Using JSON objects may reduce the memory demands on the smart energy devices because they can be parsed on the fly with minimal memory requirements.

Certain embodiments of the disclosure are directed to providing load control messages and/or instructions to certain network devices associated with metering devices. These messages and/or instructions can instruct the metering devices to shed grid loads based on a wide variety of factors and/or scenarios. For example, messages and/or instructions may be transmitted to one or more smart meters that instruct a smart meter to enter into a relatively low power mode for a predetermined amount of time. By way of another example, messages and/or instructions may be transmitted to one or more smart meters to place one or more associated processors in a relatively low power mode for a predetermined amount of time. By way of further example, messages and/or instructions may be transmitted to one or more smart meters to place an associated HAN network into a relatively low power mode for a predetermined amount of time.

Certain embodiments may be directed to using a data interchange encoding, such as JSON, to implement a SEP. For example, messages and/or instructions may be transmitted from HAN devices through the HAN gateway by implementing a SEP using JSON. In one embodiment, a metering device may receive a control instruction for a HAN device either locally or remotely. A control instruction may include any type of instruction to control or operate a HAN device. For example, a user might remotely, using a laptop or a mobile phone, transmit an instruction to an AMI meter to set a particular temperature of the house.

Each metering device may be connected to a local area network (LAN) or a wireless area network (WAN). Once each metering device receives the instructions, the instructions may be converted to a JSON object. The JSON object can then be transmitted to a HAN connected device, such as a smart energy device. The JSON object may be transmitted through the HAN to the smart energy device.

In this manner, certain technical solutions such as managing devices with constraints on usage of memory associated with the smart energy devices s can be provided by embodiments of the disclosure.

FIG. 1 is a schematic block diagram that provides an illustrative overview of an example system 100 according to an embodiment of the disclosure. The system 100 may include a headend server 120 configured to communicate via at least one network 121 with at least one energy service interface (ESI) 122. The network 121 can be any type or combination of wired or wireless networks, local or wide area networks, and/or the Internet.

The ESI 122 may be a smart meter or other type of metering device that may accept instructions and/or perform operations for measuring electricity and/or power consumption, regulating consumption, and/or displaying consumption information. The ESI 122 may be in communication with at least one smart energy device 124 via a HAN or other network, such as 125. The smart energy device 124 may be any appliance, heater, air conditioner, etc. that is configured to be in communication with the ESI 122.

Further referring to FIG. 1, in one illustrative configuration, the ESI 122 may comprise at least a memory 102 and one or more processing units or processors 104. The one or more processors 104 may be implemented as appropriate in hardware, software, firmware, or combinations thereof. Software or firmware implementations of the one or more processors 104 may include computer-executable or machine-executable instructions written in any suitable programming language to perform the various functions described.

Memory 102 may store program instructions that are loadable and executable on the one or more processors 104, as well as data generated during the execution of these programs. Depending on the configuration and type of the ESI 122, the memory 102 may be volatile (such as random access memory (RAM)) and/or non-volatile (such as read-only memory (ROM), flash memory, etc.). The ESI 122 may also include additional removable storage 106, and/or non-removable storage 108 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 102 may include multiple different types of memory, such as static random access memory (SRAM), dynamic random access memory (DRAM), or ROM.

The memory 102, the removable storage 106, and the non-removable storage 108 are all examples of computer-readable storage media. For example, computer-readable storage media may include volatile and non-volatile, removable and non-removable media implemented in any method or technology for storage of information such as computer-readable instructions, data structures, program modules or other data. The memory 102, the removable storage 106, and the non-removable storage 108 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the server or other computing devices. Combinations of any of above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The ESI 122 may also contain one or more communication connections 110 that allow the ESI 122 to communicate with a stored database, another computing device or server, user terminals, and/or other devices on a network. The ESI 122 may also include one or more input devices 112 such as a keyboard, mouse, pen, voice input device, touch input device, etc., and one or more output devices 114, such as a display, speakers, printer, etc.

Turning to the contents of the memory 102 in more detail, the memory 102 may include an operating system 116 and one or more application programs or services for implementing the features disclosed herein including a conversion module 118. In some aspects, the conversion module 118 may be configured to convert instructions to a suitable data interchange encoding, such as JavaScript Object Notation (JSON). In some examples, the conversion module 118 may utilize the communication connections 110 for facilitating the transmission of the instructions converted to a data interchange encoding, such as JSON. The conversion module 118 may also convert the instructions into CIM object representation to a data interchange encoding, such as JSON. These instructions may then be transmitted to one or more smart energy devices, such as 124.

Figure 2:
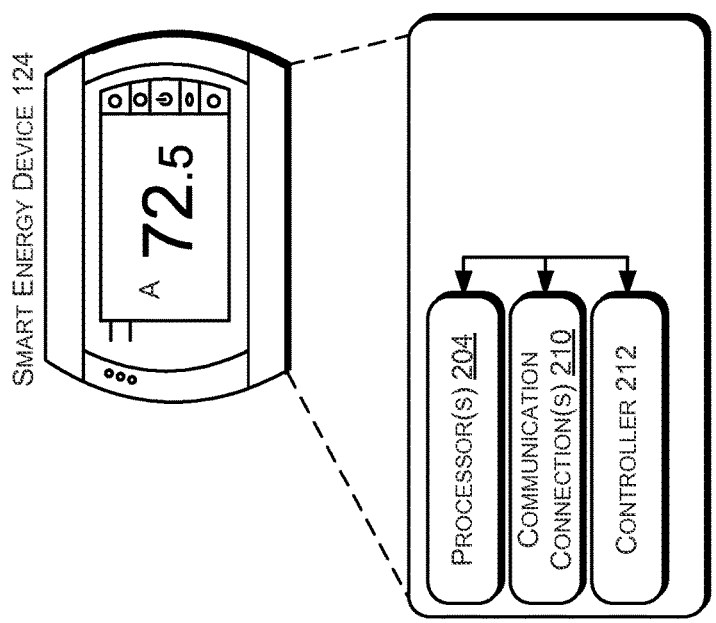
FIG. 2 is a schematic block diagram illustrating details of an example smart energy device according to an embodiment of the disclosure.

FIG. 2 is a schematic block diagram detailing an example smart energy device 124 according to an embodiment of the disclosure. The smart energy device 124 may be any appliance or device that may be controlled through the home area network (HAN). The smart energy device 124 may include a controller 212 and one or more communication connections 210. The controller 212 may be implemented in hardware, software, firmware or any combination thereof. The controller 212 may be used to execute any instructions received.

The smart energy device 124 may also include one or more processors 204. The one or more processors 204 may be implemented as appropriate in hardware, software, firmware, or combinations thereof. Software or firmware implementations of the one or more processors 204 may include computer-executable or machine-executable instructions written in any suitable programming language to perform the various functions described.

The smart energy device 124 may be, but is not limited to, any appliance, any energy consuming devices, light, or other infrastructure electrically connected in a HAN. The processor 204 may also receive instructions from the communications connections 210. The processor 204 may translate the instructions and transmit them to the controller 212. In certain embodiments, the controller 212 may also receive instructions from the communication connection(s) 210. In some examples, the controller 212 may include notifications or commands. The controller 212, for example, may be configured to manage the smart energy device 124 based at least in part on the received instructions. In one example, the controller 212 may operate the smart energy device 124 to turn the power supply on or off. In other examples, the controller 212 may be configured to change settings on a smart energy device 124.

Figure 3:
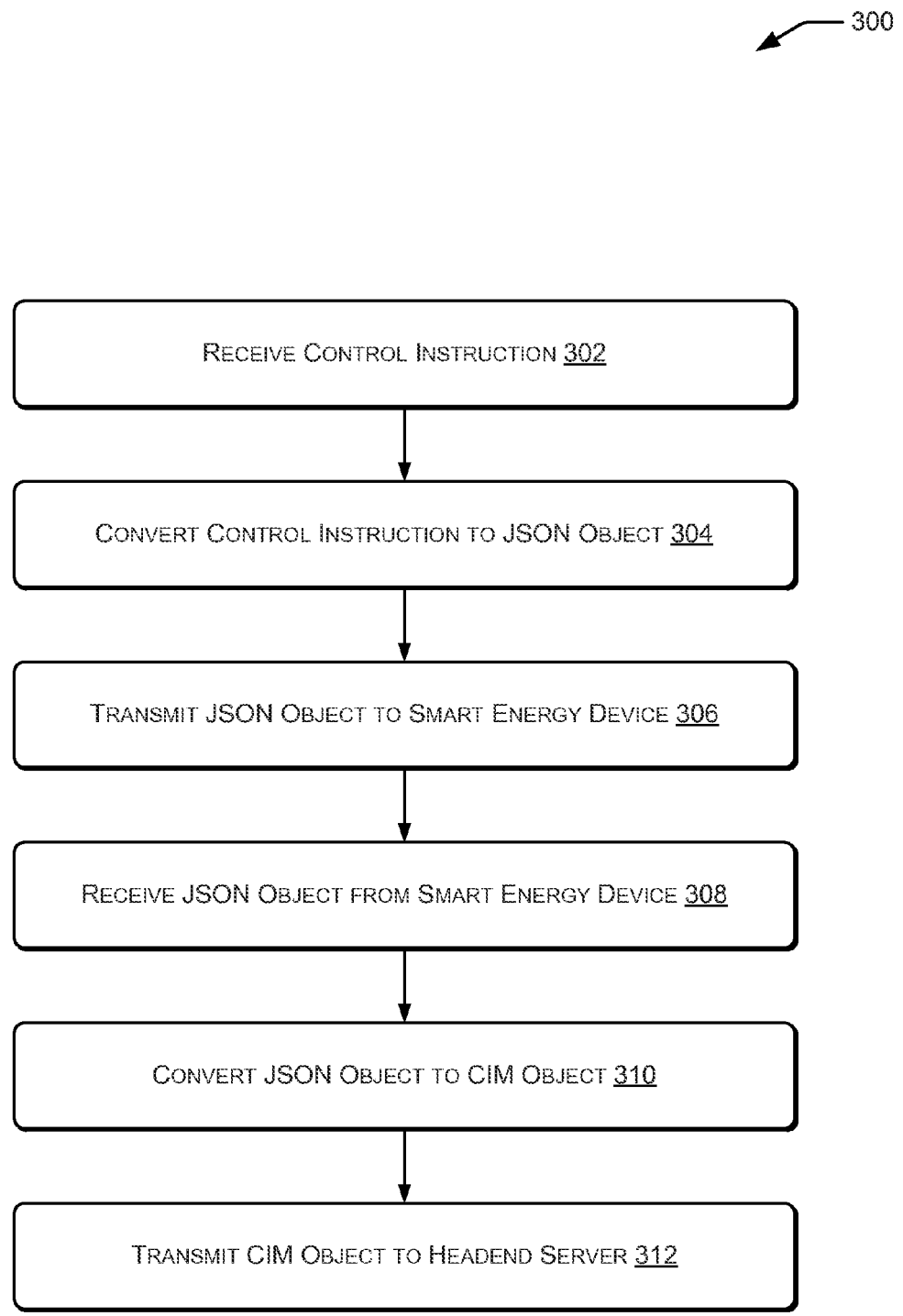
FIG. 3 is a flow chart indicating an example method for implementing a smart energy profile using a data interchange encoding, such as JSON, according to an embodiment of the disclosure.

FIG. 3 is a flow chart indicating an example method 300 to implement data interchange encoding, such as JavaScript Object Notation (JSON), processing in a smart energy profile (SEP) according to an embodiment of the disclosure. The method 300 can implement an example SEP using a suitable data interchange encoding, such as JSON. In operation block 302, in one embodiment, a ESI device, such as 122 in FIG. 1, may receive control instructions. The control instructions may include, but is not limited to, any instructions to manage a smart energy device, such as 124. The control instructions may be encoded in any suitable programming language or markup language. In certain embodiments, the control instructions may be transmitted by a headend server, such as 120. The control instructions may be received as, for example, CIM objects in the SEP 2.0 standard. In other embodiments, the control instructions may be sent from the headend server 120 as a JSON object.

In operation block 304, the control instructions can be converted into a suitable data interchange encoding object, such as a JSON object. In one illustrative embodiment, the ESI device 122 may receive a control instructions, which may be converted into a JSON object. In other embodiments, the headend server 120 may convert the control instructions into a JSON object, and then transmit it to the ESI device 122. The control instruction, which may be defined as a CIM objects, may be converted into a JSON equivalent. In one embodiment, a conversion module, such as 118, may extract and capture information for each attribute. In certain embodiments, the conversion module 118, may be written in a C object form or other suitable programming language. The conversion module 118, may extract relevant data such as smart energy device type, and state information. For example, if in SEP 2.0, a CIM object can be created to define a new temperature for a refrigerator, and the conversion module 118 may extract information pertinent to the action. The conversion module 118 may extract a smart energy device type and the relevant operation to be performed. Once the information is extracted, the conversion module 118 may create a JSON object using JSON syntax. The control module 118 may be implemented in firmware for the ESI device 122. In another embodiment, the ESI device 122 may directly receive a JSON object from the headend server 120.

In operation block 306, the JSON object can be transmitted to the smart energy device 124. In one embodiment, the JSON object may be transmitted to the smart energy device 124 using a home area network (HAN), such as 125. The smart energy device 124 may receive the JSON object through its communication connections that may be communicatively coupled with the HAN. The JSON object representation may be encoded and decoded with minimal memory resources. In this manner, a processor, such as 204, associated with the smart energy device 124 may have sufficient caching capabilities to store the JSON object and execute the instructions within the smart energy device 124. A controller, such as 212, associated with the smart energy device 124 may execute the instructions on the smart energy device 124. For example, if a JSON object describes a new temperature setting for a refrigerator, the controller 212 may transmit a signal to change the temperature for the refrigerator.

In operation block 308, the ESI device 122 may receive a JSON object from the smart energy device 124. In this embodiment, once the instructions have been executed, the controller 212 may receive a new state for the smart energy device 124. The new state reflecting the executed instruction may be encoded into a JSON object by the processor 204. This JSON object reflecting the new state of the smart energy device 124 may be transmitted to the ESI device 122 via the HAN.

In operation block 310, the JSON object can be converted into a CIM object. In this embodiment, the conversion module 118, may decode the JSON object and update the CIM object representing the particular smart energy device 124. For example, the CIM object might have an updated temperature for the refrigerator after the ESI device 122 receives the JSON object from the refrigerator. In certain embodiments, the CIM object may also be converted into an XML representation.

In operation block 312, the updated CIM object can be transmitted to the headend server 120. In this embodiment, the ESI device 122 may transmit the CIM object data for the smart energy device to the headend server 120 after conversion from JSON representations. The CIM object may be transmitted via a wireless network or an AMI radio. In some embodiments, the ESI device 122 may have regular schedules to transmit CIM object data for all or many of the smart energy devices in communication with the ESI device 122. For example, the ESI device 122 may have intervals where it updates the headend server of the states of all the smart energy devices. In this situation, the ESI device 122 may store the CIM objects in its memory 102. In other embodiments, the ESI device 122 may transmit the new definitions for the CIM objects immediately after conversion.

Illustrative methods and systems of implementing the load control of demand response network devices are described above. Some or all of these systems and methods may, but need not, be implemented at least partially by architectures such as those shown in FIG. 1 above.

It should be noted that the method 300 may be modified in various ways in accordance with certain embodiments of the disclosure. For example, one or more operations of the method 300 may be eliminated or executed out of order in other embodiments of the disclosure. Additionally, other operations may be added to the method 300 in accordance with other embodiments of the disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A home area network (HAN) device having a protocol language which is a non-JavaScript Object Notation (JSON) protocol language, the HAN device being communicatively coupled to an energy service interface (ESI) device which is communicatively coupled to an application head-end server of a network, and the HAN device comprising:
   at least one processor having a cache memory with sufficient capability to store a JSON object and computer-executable instructions; configured to execute the computer-executable instructions to:
   receive from the ESI device an instruction in a format that is not JSON protocol language;
   convert the received instruction from the non-JSON protocol language to a JavaScript Object Notation (JSON) object by parsing the received instruction into at least one common interface model (CIM) object, generating a C programming structure for the at least one CIM object, and encoding the C programming structure using a JSON syntax to create a JSON object;
   store the JSON object in the cache memory of the at least one processor; and
   access the cache memory to retrieve the first JSON object, parse the first JSON object on the fly to determine the instruction, convert the parsed first JSON object into the protocol language used by the HAN device, and execute the instruction after the instruction has been converted, whereby parsing of the JSON object on the fly reduces the memory demands on the ESI device.

2. The HAN device of claim 1, wherein the at least one processor is further configured to execute computer-executable instructions to transmit to the ESI device HAN device data comprising a second JSON object, the second JSON object being indicative of a previously presented state of the HAN device after execution of the received instruction by the HAN device.

3. A method for use with a home area network (HAN) device having a processor and a protocol language which is a non-JavaScript Object Notation (JSON) protocol language, the HAN device being communicatively coupled to an energy service interface (ESI) device which is communicatively coupled to an application headend server of a network, the method comprising:
   receiving from the headend server by at least one processor of an energy service portal (ESP) a control instruction for the HAN device, the control instruction being received in a non-JavaScript Object Notation (JSON) protocol language;
   converting the control instruction from the non-JSON protocol language to a JavaScript Object Notation (JSON) object, the converting comprising:
   parsing the control instruction into at least one common interface model (CIM) object; generating a C programming structure for the at least one CIM object;
   and encoding the C programming structure using a JSON syntax to create the JSON object; and
   transmitting the JSON object to the HAN device for execution of the control instruction by the HAN device, execution of the control instruction by the HAN device including:
   storing the JSON object in a cache memory of the processor having sufficient capability to store a JSON object;
   accessing the cache memory of the processor to fetch the JSON object; parsing the JSON object on the fly;
   converting the parsed JSON instruction into the protocol language used by the HAN device; and
   executing the converted control instruction by parsing the JSON object on the fly in the HAN device.

4. The method of claim 3 wherein the JSON object is a first JSON object, further comprising, in an energy service interface (ESI) device, receiving from the HAN device, updated HAN device data encoded as a second JSON object.

5. The method of claim 4 further comprising, in the ESI device, converting the updated HAN device data, encoded as the second JSON object, to a common interface model (CIM) object and transmitting the CIM object to the headend server.

6. The method of claim 3, wherein the at least one CIM object complies with a smart energy profile (SEP) standard.

7. The method of claim 3, wherein converting the control instruction further comprises generating a C programming schema for each attribute of the at least one CIM object.

8. The method of claim 7, wherein the C programming schema for each attribute of the CIM object is encoded using JSON syntax prior to transmitting the JSON object to the HAN device.

9. One or more non-transitory computer-readable media storing computer-executable instructions that, when executed by at least one processor, configure the at least one processor to perform operations comprising:
   receiving, from a headend server, by at least one processor of an energy service portal (ESP), a control instruction for a home area network (HAN) device using a protocol language which is a non-JavaScript Object Notation (JSON) protocol language;
   parsing the control instruction into at least one common interface model (CIM) object and at least one attribute;
   generating a C programming structure for the at least one CIM object; generating a C programming schema for the at least one attribute;
   encoding the C programming structure and the C programming schema using a JavaScript Object Notation (JSON) syntax to create a JSON object; and transmitting the JSON object to the HAN device for executing the control instruction in the HAN device, wherein executing the control instruction in the HAN device comprises:

storing the JSON object in a cache memory of the at least one processor having sufficient capability to store the JSON object; and accessing the cache memory of the at least one processor to execute the control instruction by parsing the JSON object on the fly in the HAN device, converting the parsed JSON instruction into the protocol language used by the HAN device, and executing the instruction after it has been converted.

10. A system for operating a home area network (HAN) device communicatively coupled to a metering device which is an energy service interface (ESI) device communicatively coupled to an application headend server of a first network comprising:

the metering device receiving an instruction message for the HAN device, the received instruction message being in a format that is not JavaScript Object Notation (JSON) syntax, the metering device converting the received non-JSON instruction message into a JavaScript Object Notation (JSON) object representing the instruction message, the converting including parsing the instruction message into at least one common interface model (CIM) object, generating a C programming structure for the at least one CIM object, and encoding the C programming structure using a JSON syntax to create the JSON object, and transmitting the JSON object to the HAN device which has a protocol language which is a non-JSON protocol language; and the HAN device, which has at least one processor having a cache memory having sufficient capability to store a JSON object, the processor configured to execute the computer-executable instructions, operating to:

receive from the metering device the transmitted JSON object;

store the JSON object in the cache memory of the at least one processor;

access the JSON object in the cache memory of the at least one processor;

parse the JSON object on the fly to determine the received instruction represented by the JSON object;

convert the parsed JSON instruction to create the instruction message into the non-JSON protocol language of the HAN device and execute the created non-JSON received instruction as determined from the parsing and the converting.

11. The system of claim 10 wherein the at least one processor with the cache memory of the HAN device are further configured to extract relevant data related to an attribute of the JSON object.

12. The HAN device of claim 1 wherein the processor with the cache memory is configured to extract relevant data related to an attribute of the CIM object.

13. The method of claim 3 further including extracting relevant data related to an attribute of the JSON object.

14. The HAN device of claim 3 wherein the common interface model (CIM) object has at least one attribute and the HAN device has at least one processor with the cache memory configured to extract relevant data related to the attribute.

15. The system of claim 10 wherein the JSON object is a first JSON object, the metering device is further configured to receive from the HAN device updated HAN device data encoded as a second JSON object.

16. The system of claim 15 wherein the metering device is further configured to convert the updated HAN device data, encoded as the second JSON object, to a common interface model (CIM) object and to transmit the CIM object to a headend server.

17. The system of claim 10 wherein the at least one CIM object complies with a smart energy profile (SEP) standard.

18. The system of claim 10 wherein the metering device converting the instruction message further comprises generating a C programming schema for each attribute of the at least one CIM object.

19. The system of claim 18 wherein the C programming schema for each attribute of the CIM object is encoded using JSON syntax prior to transmitting the JSON object to the HAN device.

* * * * *